(12) United States Patent
Guo et al.

(10) Patent No.: US 10,164,549 B2
(45) Date of Patent: Dec. 25, 2018

(54) POWER MODULE CASCADED CONVERTER SYSTEM

(71) Applicant: Delta Electronics (Shanghai) Co., Ltd., Shanghai (CN)

(72) Inventors: Desheng Guo, Shanghai (CN); Weiqiang Zhang, Shanghai (CN); Baoyu Liu, Shanghai (CN)

(73) Assignee: Delta Electronics (Shanghai) Co., Ltd., Shanghai (CN)

(*) Notice: Subject to any disclaimer, the term of this patent is extended or adjusted under 35 U.S.C. 154(b) by 0 days.

(21) Appl. No.: 15/832,761

(22) Filed: Dec. 5, 2017

(65) Prior Publication Data

US 2018/0212532 A1    Jul. 26, 2018

(30) Foreign Application Priority Data

Jan. 24, 2017  (CN) .......................... 2017 1 0060075

(51) Int. Cl.
*H02M 7/25*    (2006.01)
*H02M 7/219*   (2006.01)
*H02M 7/00*    (2006.01)
*H02M 1/32*    (2007.01)
*H02M 7/483*   (2007.01)

(52) U.S. Cl.
CPC ............. *H02M 7/25* (2013.01); *H02M 7/003* (2013.01); *H02M 7/219* (2013.01); *H02M 2001/325* (2013.01); *H02M 2007/4835* (2013.01)

(58) Field of Classification Search
CPC ..... H02M 2001/007; H02M 2001/008; H02M 1/32; H02M 3/285; H02M 7/003; H02M 7/219; H02M 7/25; H02M 7/49; H02M 7/493; H02M 7/5387; H02M 7/797; H02M 2007/4835

See application file for complete search history.

(56) References Cited

U.S. PATENT DOCUMENTS

| 2010/0213921 | A1* | 8/2010 | Abolhassani | ......... H01F 27/385 |
| | | | | 323/328 |
| 2010/0328883 | A1* | 12/2010 | Ledezma | .............. H02M 7/003 |
| | | | | 361/690 |
| 2011/0057724 | A1* | 3/2011 | Pabon | ................... H02M 7/219 |
| | | | | 327/581 |

(Continued)

*Primary Examiner* — Emily P Pham
*Assistant Examiner* — Shahzeb K Ahmad
(74) *Attorney, Agent, or Firm* — CKC & Partners Co., Ltd.

(57) ABSTRACT

Disclosed is a power module cascaded converter system, a control sub-system thereof includes a master controller, and is provided with switch modules corresponding one-to-one to power modules. For each switch module, before the corresponding power module is removed, a driver circuit thereof can drive the switch circuit into a closed state through a control signal sent from the master controller, so as to bypass the power module. An optical-electric module in the power module cascaded converter system converts an optical signal input from an optical fiber into an electrical signal. With a first control port of each switch module, which is detachably and electrically coupled to a second control port of the power module, the power module cascaded converter system can support insertion and extraction of the power module without cutting off electricity, thereby adding flexibility and convenience for replacing power modules.

8 Claims, 4 Drawing Sheets

(56) References Cited

U.S. PATENT DOCUMENTS

| | | | | |
|---|---|---|---|---|
| 2012/0104952 A1* | 5/2012 | Chen | ............... | H05B 33/083 |
| | | | | 315/122 |
| 2013/0121042 A1* | 5/2013 | Gan | ............... | H02M 7/49 |
| | | | | 363/37 |
| 2014/0268928 A1* | 9/2014 | Wei | ............... | H02M 5/458 |
| | | | | 363/37 |
| 2015/0333660 A1* | 11/2015 | Kim | ............... | H02M 1/32 |
| | | | | 363/123 |

* cited by examiner

POWER MODULE CASCADED CONVERTER SYSTEM

CROSS REFERENCE TO RELEVANT APPLICATIONS

The present application claims the priority of the Chinese patent application No. 201710060075.2, entitled "Power Module Cascaded Converter System", filed on Jan. 24, 2017, the content of which is hereby incorporated by reference in its entirety.

TECHNICAL FIELD

The present invention relates to power technologies, particularly to a power module cascaded converter system.

BACKGROUND

Modular multilevel converter (MMC) is a new type of voltage transforming circuit. Being capable of realizing electrical energy transformation for middle/high voltages with features such as little harmonic in output and high degree of modularity, the MMC has wide application prospect in the electrical power system.

In prior art, the MMC forms a current path via multiple power modules connected in series, and input voltages can be a higher voltage for that the multiple power modules are connected in series, allowing the MMC to transfer energy from one high level to another voltage level. However, due to the material and complex interface of optical fibers, which are typically adopted as the signal transmission carrier between the master controller and the power modules in the middle/high voltage system, it is difficult for the MMC to detach and introduce individual power module without cutting off the electricity.

SUMMARY

The present invention provides a power module cascaded converter system that is used for solving the technical problem in modular multilevel converters (MMCs) of prior art that the detaching and introducing of individual power module without cutting off the electricity cannot be realized.

A first aspect of the present invention provides a power module cascaded converter system, including: a control sub-system and a power sub-system, where the control sub-system includes: a master controller and N switch modules connected in series, each of the switch modules including: a first power port, a first control port, a driver circuit, an optical-electric module and a switch circuit; the power sub-system includes: N power modules, each of the power modules including: a second power port, a second control port and a power conversion circuit, where N is an integer greater than one;

the first power port of each of the switch modules is electrically connected to the second power port of corresponding one of the power modules;

the master controller is connected to the optical-electric module of each of the switch modules through an optical fiber, and the optical-electric module of each of the switch modules is electrically connected to the first control port, the first control port of each of the switch modules is detachably and electrically connected to the second control port of corresponding one of the power modules, so that the master controller transmits, via the switch modules, control signals with the corresponding power modules; and the master controller transmits the control signals to the driver circuit of each of the switch modules, so as to control the driver circuit of each of the switch modules to drive the switch circuit of each of the switch modules to close or open, causing the corresponding power module to be bypassed or not bypassed.

Optionally, the switch circuit includes: a first silicon controlled rectifier (SCR) and a second SCR, where the first SCR and the second SCR are connected in anti-parallel; and the driver circuit of each of the switch modules drives the first SCR and the second SCR.

Optionally, the switch circuit includes: a first insulated gate bipolar transistor (IGBT), a first diode, a second IGBT and a second diode;

where a positive electrode of the first diode is connected to an emitter of the second IGBT, a negative electrode of the first diode is connected to a collector of the first IGBT, an emitter of the first IGBT is connected to a positive electrode of the second diode, and a negative electrode of the second diode is connected to a collector of the second IGBT.

Further, each of the switch modules includes: a micro controller unit;

where the optical-electric module of each of the switch modules is electrically connected to the first control port and the driver circuit via the micro controller unit.

Optionally, the power module cascaded converter system includes N electrical connectors, each of the electrical connectors including: a first assembly and a second assembly;

where the first assembly integrates the first power port and the first control port of one of the switch modules, and the second assembly integrates the second power port and the second control port of the corresponding one of the power modules.

Optionally, the first assembly of each of the electrical connectors includes at least two guide grooves and the second assembly includes guide pins corresponding to the guide grooves.

Optionally, each of the switch modules is electrically connected to the corresponding first power port and causes the corresponding second power port to be bypassed or not bypassed.

Optionally, the power conversion circuit of each of the power modules is electrically connected to the corresponding second power port.

BRIEF DESCRIPTION OF DRAWINGS

A brief introduction will be given hereinafter to the accompany drawings which will be used in the description of the embodiments or prior art in order to explain the technical solutions of the present invention or prior art more clearly. Apparently, the drawings in the description below are merely illustrating some embodiments of the present invention. Those skilled in the art may obtain other drawings according to these drawings without paying any creative effort.

DETAILED DESCRIPTION

Now the technical solutions in embodiments of the present invention will be described hereunder clearly and comprehensively with reference to accompanying drawings. Obviously, the described embodiments are only some, rather than all, embodiments of the present invention. Any and all other embodiments obtained by persons of ordinary skill in the art based on the embodiments of the present invention without making any creative effort shall fall into the protection scope of the present invention.

In prior art, a modular multilevel converters (MMC) forms a current path via multiple power modules connected in series, and input voltages can be a higher voltage for that the multiple power modules are connected in series, allowing the MMC to transfer energy from one high level to another voltage level. Yet in the MMC, no bypass switch is provided in the exterior of the power modules, and the power modules are connected in series. Thus, the current path in the MMC will be lost and the MMC will be prevented from operating properly, if any one of the power modules is removed. Meanwhile, existing MMCs use the optical fiber as the carrier of signal transmission. That is, a master controller is connected to optical fiber interfaces of the power modules through optical fibers, to transmit control signals to the power modules. Since the optical fibers cannot be used for real-time insertion (plug-in) and extraction (pull-out) actions, it is difficult for existing MMCs to fulfill the demand of introducing or detaching the power modules without cutting off the electricity.

In view of the above situations, an embodiment of the present invention proposes a power module cascaded converter system. Those of ordinary skill in the art will appreciate that the power module cascaded converter system may be any type of system in which multiple power modules in series connection are provided. For instance, the power module cascaded converter system may be a solid state transformer (SST), etc.

Now, technical solutions of the present invention will be detailed in conjuncture with particular embodiments, using an MMC as an example of the power module cascaded converter system. It should be noted that the particular embodiments hereunder may be combined with each other, and same or similar concepts or processes might not be repeated in some embodiments.

Figure 1:
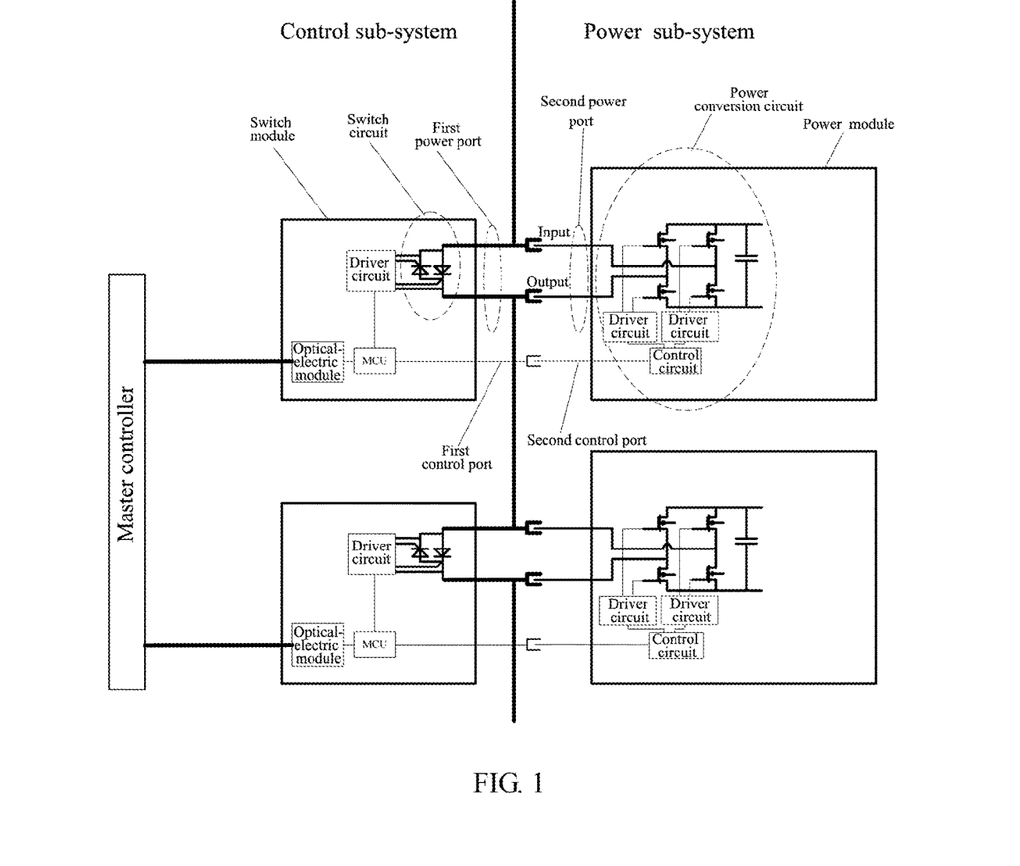
FIG. 1 is a schematic structural diagram of a power module cascaded converter system provided in an embodiment of the present invention.

FIG. 1 is a schematic structural diagram of a power module cascaded converter system provided in an embodiment of the present invention. As depicted in FIG. 1, the power module cascaded converter system includes a control sub-system and a power sub-system.

The control sub-system includes a master controller and N switch modules connected in series. Here, the master controller is connected to each of the switch modules. Each switch module includes a first power port, a first control port, a driver circuit, an optical-electric module and a switch circuit.

The power sub-system includes N power modules. Each power module includes a second power port, a second control port and a power conversion circuit, where N may be an integer greater than one (N equals two as an example in the power module cascaded converter system illustrated in FIG. 1). It should be noted that the power conversion circuit shown in FIG. 1 is merely an illustration of, rather than a limitation on, the present invention.

The first power port of each switch module is electrically connected to the second power port of the corresponding power module, where the master controller can transmit a control signal to the driver circuit of each switch module, so as to control the driver circuit of the switch module to drive the switch circuit to close or open, causing the power module corresponding to the switch module to be bypassed or not bypassed. For example, the switch module may be electrically connected to the corresponding first power port, and the switch module may cause the corresponding second power port to be bypassed or not bypassed. Further, the power conversion circuit may be electrically connected to the corresponding second power port. Thus, the corresponding power conversion circuit can be bypassed or not bypassed. As the corresponding power module is bypassed, the corresponding power module can be pulled out or plugged in.

In an embodiment, when the power module is operating normally, the master controller can control the driver circuit of the switch circuit to drive the switch circuit to open, so that the power module corresponding to the switch module is not bypassed, thereby allowing the power module to be connected into the cascaded converter system in series while maintaining normal operation of the power module cascaded converter system. When removal of a certain power module is desired, the master controller can control the driver circuit of the switch circuit to drive the switch circuit to close, so that the power module corresponding to the switch module is bypassed, thereby maintaining the current path in the power module cascaded converter system after the power module is removed therefrom and ensuring normal operation of the power module cascaded converter system. With the above described means, the power module cascaded converter system can flexibly increase the number of power modules in the cascaded converter system to transmit power.

The master controller is connected to the optical-electric module of each switch module through the optical fiber, and the optical-electric module of each switch module is electrically connected to the first control port. That is, the first control port of each switch module is an electrical interface and is detachably and electrically connected to the second control port of the corresponding power module. The master controller transmits a control signal to the corresponding power module via the switch module, and then the power module performs a corresponding operation according to the control signal. Thus, plug-in or pull-out of the optical fiber may be largely prevented.

Here, reference can be made to prior art for the particular manner in which the power module performs the operation according to the control signal sent from the master controller, which will not be repeated herein.

In prior art, a master controller of an MMC is connected to a second control port of each power module through an optical fiber directly. That is, the second control port of each power module is an optical fiber port. Since optical fibers do not support hot swapping, when removing a certain power module, the MMC has to be powered off before the power module can be removed. Instead, in the power module cascaded converter system provided in the embodiment of the present invention, the first control port is detachably and electrically connected to the second control port, allowing the first control port of the switch module to be disconnected or re-connected to the second control port of the power module without cutting off the electricity of the power module cascaded converter system, which improves flexibility and convenience for replacing power modules.

Now, operation principals will be explained for the above power module cascaded converter system by way of example.

Figure 4:
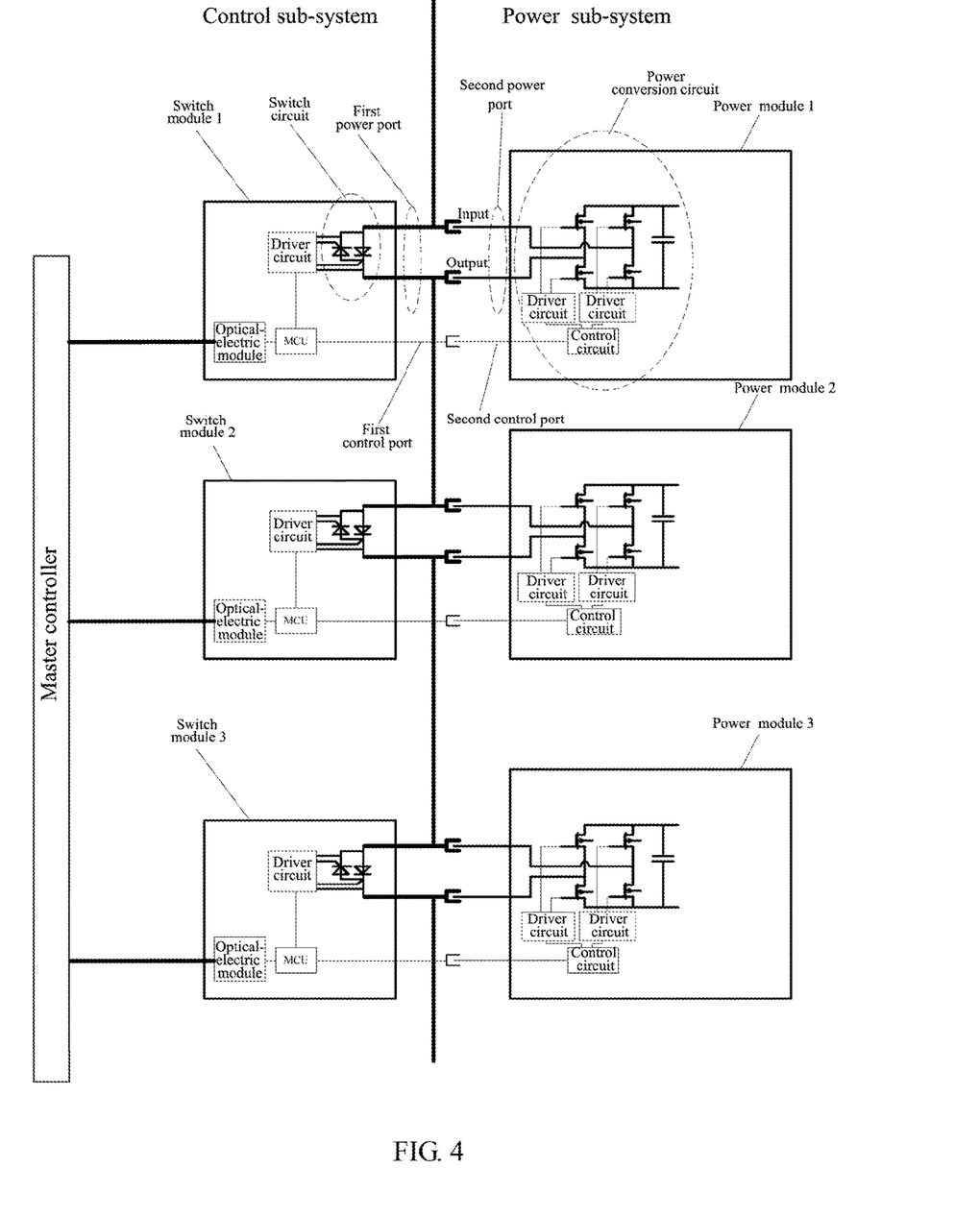
FIG. 4 is a schematic structural diagram of still another power module cascaded converter system provided in an embodiment of the present invention.

FIG. 4 is a schematic structural diagram of still another power module cascaded converter system provided in an embodiment of the present invention. As shown in FIG. 4, assume that a power module cascaded converter system includes three switch modules connected in series, which are switch module 1, switch module 2 and switch module 3, respectively. Accordingly, the power module cascaded converter system includes three power modules connected in series, which are power module 1, power module 2 and power module 3, respectively.

Here, a master controller is connected, via optical fibers, to an optical-electric module of the switch module 1, an optical-electric module of the switch module 2 and an optical-electric module of the switch module 3, respectively. The optical-electric module of the switch module 1 is electrically connected to a first control port of the switch module 1, the optical-electric module of the switch module 2 is electrically connected to a first control port of the switch module 2, and the optical-electric module of the switch module 3 is electrically connected to a first control port of the switch module 3.

A first power port of the switch module 1 is electrically connected to a second power port of the power module 1, and the first control port of the switch module 1 is electrically connected to a second control port of the power module 1. A first power port of the switch module 2 is electrically connected to a second power port of the power module 2, and the first control port of the switch module 2 is electrically connected to a second control port of the power module 2. A first power port of the switch module 3 is electrically connected to a second power port of the power module 3, and the first control port of the switch module 3 is electrically connected to a second control port of the power module 3.

The operation principal of the power module cascaded converter system will be explained by taking a case of removing the power module 2 from the power module cascaded converter system as an example.

First step: while the power module 2 is operating, under the control of the master controller, a driver circuit of the switch module 2 drives a switch circuit of the switch module 2 into an opened state, so that the power module 2 corresponding to the switch module 2 is not bypassed, thereby allowing the power module 2 to receive and output power.

Second step: the master controller transmits an optical control signal to the optical-electric module of the switch module 2 via the optical fiber. The optical-electric module of the switch module 2 converts the optical control signal into an electrical control signal, and transmits the same to the power module 2 via the first control port of the switch module 2 and the second control port of the power module 2 that are connected electrically. In this example, the electrical control signal is used for instructing the power module 2 to stop operating. After the electrical control signal is received, the power module 2 stops operating.

Third step: the master controller transmits a control signal to the driver circuit of the switch module 2, to instruct the driver circuit of the switch module 2 to drive the switch circuit of the switch module 2 into a closed state, so that the power module 2 corresponding to the switch module 2 is bypassed. The third step may be operated at the same time with the second step, or the third step and the second step may be operated at different order, the invention is not limited to this.

Thus, maintenance personnel can, without cutting off the electricity of the power module cascaded converter system, disconnect the electrical connection between the first power port of the switch module 2 and the second power port of the power module 2, as well as that between the first control port of the switch module 2 and the second control port of the power module 2, and then detach the power module 2. At this point, the power module 2 is removed from the power module cascaded converter system. Hence, by using electrical interfaces between the master controller and the power module, as well as between the switch module and the power module, a convenient module removal solution is realized.

The operation principal of the power module cascaded converter system will be explained by taking a case of inserting the power module 2 into the power module cascaded converter system as an example.

First step: during normal operation of the power module cascaded converter system, an unactivated power module 2 is inserted in the power module cascaded converter system, the first power port of the switch module 2 is electrically connected to the second power port of the power module 2, and the first control port of the switch module 2 is electrically connected to the second control port of the power module 2.

Second step: the power module cascaded converter system may supply power, e.g., via an auxiliary power supply or busbar capacitor charging, to the power module 2 to start a control circuit of the power module 2.

Third step: the power module 2 transmits an electrical control signal to the optical-electric module of the switch module via the second control port of the switch module 2 and the first control port of the switch module 2 that are connected electrically. The optical-electric module of the switch module 2 converts the electrical control signal into an optical control signal, and transmits the optical control signal to the master controller via the optical fiber. In this example, the optical control signal is used for indicating to the master controller that the power module 2 is ready for entering into the operation state.

Fourth step: the master controller transmits a control signal to the driver circuit of the switch module 2 according to the received optical control signal, to instruct the driver circuit of the switch module 2 to drive the switch circuit of the switch module 2 into an opened state, so that the power module 2 corresponding to the switch module 2 is not bypassed.

Thus, maintenance personnel can, without cutting off the electricity of the power module cascaded converter system, establish the electrical connection between the first power port of the switch module 2 and the second power port of the power module 2, as well as that between the first control port of the switch module 2 and the second control port of the power module 2, and then instruct the switch module to stop bypassing the power module 2, to insert the power module 2 into the power module cascaded converter system. At this point, the process of installing the power module 2 in the power module cascaded converter system is completed.

In the power module cascaded converter system provided in the embodiment of the present invention, in addition to the master controller, the control sub-system of the power module cascaded converter system is further provided with switch modules that correspond one-to-one to the power modules. For each switch module, before the corresponding power module is removed, the driver circuit of the switch module can drive the switch circuit into a closed state through the control signal sent from the master controller, so as to bypass the power module, which ensures normal operation of the power module cascaded converter system. Further, the first control port of each switch module in the power module cascaded converter system is detachably and electrically connected to the second control port of the power module, allowing the power module cascaded converter system to support insertion and extraction of the power module without cutting off the electricity, which adds flexibility and convenience for replacing the power modules. Further, each power module may include a power conversion circuit for electricity conversion, such as AC-DC conversion. The power conversion circuit may further be driven by the driver circuit of the power module according to control signals of the control circuit of the power module.

Further, the control sub-system may include two or more switch modules connected in series, and the power sub-system may include two or more power modules connected in series. Further, the control sub-system may include three or more switch modules connected in series, and the power sub-system may include three or more power modules connected in series, the invention is not limited thereto.

Further, on the basis of the above embodiment, this embodiment relates to a particular configuration for the aforementioned switch circuit, which includes, for instance, two types in the following.

First type: continuing on FIG. 1, the switch circuit may include: a first silicon controlled rectifier (SCR) and a second SCR that are in anti-parallel. The driver circuit drives the first SCR and the second SCR.

Optionally, when the first SCR is a forward SCR and the second SCR is a backward SCR. The power module cascaded converter system may receive AC input current. After receiving a control signal sent from the master controller for closing the switch circuit, the driver circuit can drive the first SCR to conduct during the positive half cycle of the AC input current, and drive the second SCR to conduct during the negative half cycle of the AC input current. Thus, the first SCR forms a current path inside the switch module during the positive half cycle of the AC input current, and the second SCR forms a current path inside the switch module during the negative half cycle of the AC input current, thereby maintaining a continued current path inside the switch module, so that the purpose of bypassing the power module corresponding to the switch module is achieved. Optionally, when the first SCR is a backward SCR and the second SCR is a forward SCR, after receiving the control signal from the master controller for closing the switch circuit, the driver circuit can drive the second SCR to conduct during positive half cycle of the AC input current, and drive the first SCR to conduct during negative half cycle of the AC input current.

Figure 2:
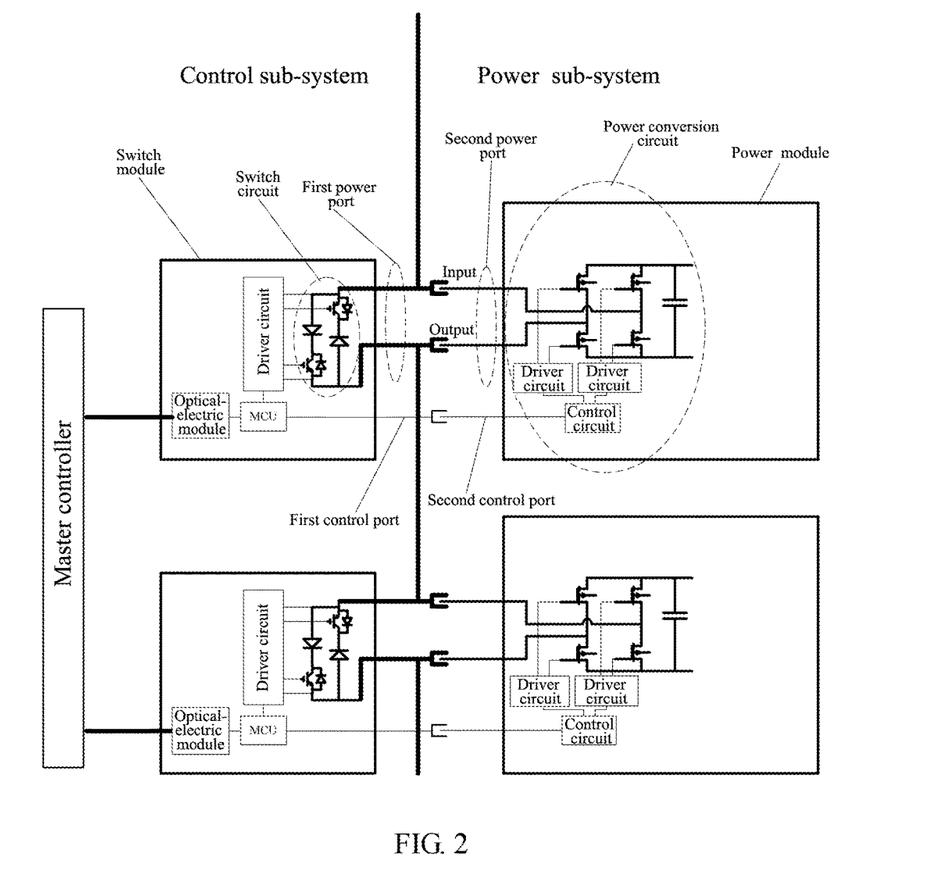
FIG. 2 is a schematic structural diagram of another power module cascaded converter system provided in an embodiment of the present invention.

Second type: FIG. 2 is a schematic structural diagram of another power module cascaded converter system provided in another embodiment of the present invention. As depicted in FIG. 2, the switch circuit may include: a first insulated gate bipolar transistor (IGBT), a first diode, a second IGBT and a second diode.

A positive electrode of the first diode is connected to an emitter of the second IGBT, a negative electrode of the first diode is connected to a collector of the first IGBT, an emitter of the first IGBT is connected to a positive electrode of the second diode, and a negative electrode of the second diode is connected to a collector of the second IGBT.

In the above embodiment, the master controller may be either directly of the switch module via the optical fiber, or connected to the driver circuit via the optical-electric module of the switch module. Referring to FIG. 1 or 2, when the master controller is connected to the driver circuit via the optical-electric module of the switch module, each of the above switch module may further include: a micro controller unit (MCU), where the optical-electric module of each switch module is electrically connected to the first control port and the driver circuit via the MCU. Thus, the optical-electric module of each switch module converts an optical control signal that is sent from the master controller via the optical fiber into an electrical control signal, and then transmits the electrical control signal to the MCU of the switch module. After receiving the electrical control signal converted by the optical-electric module, the MCU may transmit the same to the driver circuit if the electrical control signal is determined to be sent by the master controller for the driver circuit, causing the driver circuit to drive the switch circuit into an closed or opened state according to the electrical control signal, thereby maintaining normal operation of the power module cascaded converter system. If the electrical control signal is determined to be sent by the master controller for the power module, the electrical control signal is forwarded to the power module via the first control port that is detachably and electrically connected to the second control port of the power module, allowing the power module to perform corresponding operations according to the control signal from the master controller, thereby maintaining normal operation of the power module cascaded converter system. That is, only one fiber can be used for both the switch module and the power module. In this way, reusing is realized for the optical fiber link between the master controller and the switch module, which reduces the cost for the power module cascaded converter system, and simplifies the structure of the power module cascaded converter system.

Figure 3:
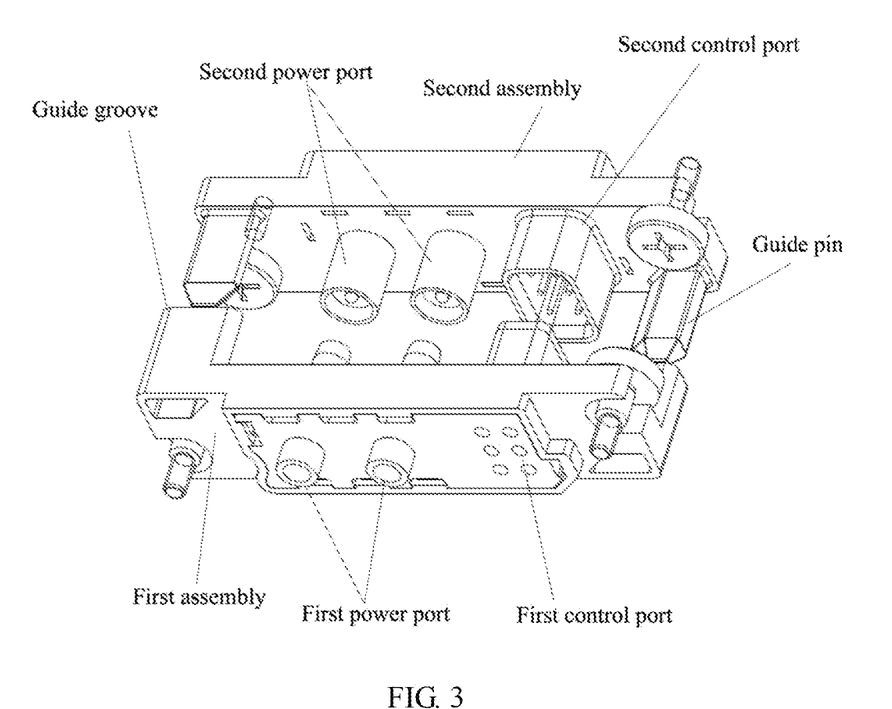
FIG. 3 is a schematic structural diagram of an electrical connector in a power module cascaded converter system provided in an embodiment of the present invention.

FIG. 3 is a schematic structural diagram of an electrical connector in a power module cascaded converter system provided in an embodiment of the present invention. As explained in the above embodiments, the switch module is provided with the first power port that is connected to the second power port of the power module, and the first control port that is connected to the second control port of the power module. Therefore, in order to improve the efficiency in removing and installing the power module, a power module cascaded converter system in an embodiment of the present invention may further include N electrical connectors. As depicted in FIG. 3, each electrical connector includes: a first assembly and a second assembly, where the first assembly can be located on the switch module for integrating the first power ports and the first control ports of the switch modules, and the second assembly can be located on the power module for integrating the second power ports and the second control ports of the power module.

When inserting a power module into the power module cascaded converter system, maintenance personnel can, by joining the first assembly with the second assembly, connect the first power ports of the switch modules to the second power ports of the power modules, and connect the first control ports of the switch modules to the second control ports of the power modules, thereby improving efficiency for installing the power module. Further, the first assembly of the electrical connector may further include at least two guide grooves, and the second assembly includes guide pins corresponding to the guide grooves, thus allowing the maintenance personnel to blind-mate the first assembly to the second assembly when installing the power module, further improving efficiency of the installation.

Accordingly, when removing a power module, the maintenance personnel can, by detaching the first assembly from the second assembly, disconnect the first power port of the switch module from the second power port of the power module, and disconnect the first control port of the switch module from the second control port of the power module, thereby improving efficiency of removing the power module.

In the power module cascaded converter system provided in the embodiment of the present invention, the first assembly and the second assembly are provided on the switch module and the power module, respectively, which adds convenience to the disconnecting/connecting of the switch module from/to the power module, thereby improve the efficiency in removing and installing the power module.

Finally, it should be noted that the foregoing embodiments are merely intended for describing, rather than limiting, the technical solutions of the present invention. Although the present invention is described in detail with reference to the foregoing embodiments, persons of ordinary skill in the art should understand that they may still make modifications to the technical solutions described in the foregoing embodiments, or make equivalent replacements to some or all technical features therein: however, these modifications or replacements do not make the essence of corresponding technical solutions depart from the scope of the technical solutions in the embodiments of the present invention.

What is claimed is:

1. A power module cascaded converter system, comprising: a control sub-system and a power sub-system, wherein the control sub-system comprises: a master controller and N switch modules that are connected in series, each of the switch modules comprising: a first power port, a first control port, a driver circuit, an optical-electric module and a switch circuit; the power sub-system comprises: N power modules, each of the power modules comprising: a second power port, a second control port and a power conversion circuit, wherein N is an integer greater than one;

the first power port of each of the switch modules is electrically connected to the second power port of corresponding one of the power modules;

the master controller is connected to the optical-electric module of each of the switch modules through an optical fiber, and the optical-electric module of each of the switch modules is electrically connected to the first control port, the first control port of each of the switch modules is detachably and electrically connected to the second control port of corresponding one of the power modules, so that the master controller transmits, via the switch modules, control signals with the corresponding power modules; and the master controller transmits the control signals to the driver circuit of each of the switch modules, so as to control the driver circuit of each of the switch modules to drive the switch circuit of each of the switch modules to close or open, causing the corresponding power module to be bypassed or not bypassed.

2. The system according to claim 1, wherein the switch circuit comprises: a first silicon controlled rectifier (SCR) and a second SCR, wherein the first SCR and the second SCR are connected in anti-parallel; and the driver circuit of each of the switch modules drives the first SCR and the second SCR.

3. The system according to claim 1, wherein the switch circuit comprises: a first insulated gate bipolar transistor (IGBT), a first diode, a second IGBT and a second diode;

wherein a positive electrode of the first diode is connected to an emitter of the second IGBT, a negative electrode of the first diode is connected to a collector of the first IGBT, an emitter of the first IGBT is connected to a positive electrode of the second diode, and a negative electrode of the second diode is coupled to a collector of the second IGBT.

4. The system according to claim 1, wherein each of the switch modules comprises: a micro controller unit;

wherein the optical-electric module of each of the switch modules is electrically connected to the first control port and the driver circuit via the micro controller unit.

5. The system according to claim 1, wherein the power module cascaded converter system comprises N electrical connectors, each of the electrical connectors comprising: a first assembly and a second assembly;

wherein the first assembly integrates the first power port and the first control port of one of the switch modules, and the second assembly integrates the second power port and the second control port of the corresponding one of the power modules.

6. The system according to claim 5, wherein the first assembly of each of the electrical connectors comprises at least two guide grooves, and the second assembly comprises guide pins corresponding to the guide grooves.

7. The system according to claim 1, wherein each of the switch modules is electrically connected to the corresponding first power port and causes the corresponding second power port to be bypassed or not bypassed.

8. The system according to claim 7, wherein the power conversion circuit of each of the power modules is electrically connected to the corresponding second power port.

* * * * *